(12) United States Patent
Hirano

(10) Patent No.: US 12,280,528 B2
(45) Date of Patent: Apr. 22, 2025

(54) MOLDING MACHINE, METHOD AND COMPUTER-READABLE MEDIUM USING MULTIPLE LEARNING MODELS

(71) Applicant: The Japan Steel Works, Ltd., Tokyo (JP)

(72) Inventor: Takayuki Hirano, Tokyo (JP)

(73) Assignee: The Japan Steel Works, Ltd., Tokyo (JP)

( * ) Notice: Subject to any disclaimer, the term of this patent is extended or adjusted under 35 U.S.C. 154(b) by 461 days.

(21) Appl. No.: 17/770,419

(22) PCT Filed: Oct. 8, 2020

(86) PCT No.: PCT/JP2020/038176
§ 371 (c)(1),
(2) Date: Apr. 20, 2022

(87) PCT Pub. No.: WO2021/079751
PCT Pub. Date: Apr. 29, 2021

(65) Prior Publication Data
US 2022/0402183 A1    Dec. 22, 2022

(30) Foreign Application Priority Data
Oct. 23, 2019   (JP) .................................. 2019-192840

(51) Int. Cl.
*B29C 45/76*   (2006.01)
*G05B 13/02*   (2006.01)

(52) U.S. Cl.
CPC ........ *B29C 45/768* (2013.01); *G05B 13/0265* (2013.01); *B29C 2945/76163* (2013.01); *B29C 2945/76949* (2013.01)

(58) Field of Classification Search
None
See application file for complete search history.

(56) References Cited

U.S. PATENT DOCUMENTS

| 10,416,617 B2 | 9/2019 | Shiraishi et al. |
| 10,618,202 B2 | 4/2020 | Maruyama |

(Continued)

FOREIGN PATENT DOCUMENTS

| CN | 106393618 A | 2/2017 |
| CN | 108688105 A | 10/2018 |

(Continued)

OTHER PUBLICATIONS

English translation of International Search Report for PCT Application No. PCT/JP2020/038176 mailed Nov. 24, 2020, 2 pages.

(Continued)

*Primary Examiner* — Bernard G Lindsay
(74) *Attorney, Agent, or Firm* — Bret E. Field; Bozicevic, Field & Francis LLP

(57) ABSTRACT

First training data including a set value related to a molding machine, a measured value obtained by measuring a physical quantity related to molding, and a degree of quality of a molded product generated by the molding machine is collected, a first learning model for outputting a degree of quality of a molded product when a set value and a measured value are input is generated by machine learning based on collected first training data, second training data including a defect degree for each defect type of a molded product, a measured value, and a set value capable of reducing the defect degree is collected, and a second learning model for outputting a set value capable of reducing a defect degree when a defect degree and a measured value are input is generated by machine learning based on collected second training data and a degree of quality output from the first learning model.

12 Claims, 9 Drawing Sheets

(56) References Cited

U.S. PATENT DOCUMENTS

| | | | |
|---|---|---|---|
| 2006/0224540 A1 | 10/2006 | Shioiri et al. | |
| 2017/0031330 A1 | 2/2017 | Shiraishi et al. | |
| 2017/0173835 A1* | 6/2017 | Uchiyama | G05B 19/41875 |
| 2018/0157933 A1* | 6/2018 | Brauer | G06F 18/24143 |
| 2018/0281256 A1 | 10/2018 | Asaoka et al. | |
| 2019/0093187 A1* | 3/2019 | Lee | G06N 3/08 |
| 2019/0101897 A1 | 4/2019 | Iijima et al. | |
| 2019/0137969 A1 | 5/2019 | Watanabe et al. | |
| 2019/0389111 A1* | 12/2019 | Stiefel | B29C 45/77 |
| 2020/0094461 A1* | 3/2020 | Okubo | B29C 31/04 |
| 2020/0202235 A1* | 6/2020 | Chen | G06F 17/18 |
| 2020/0398467 A1* | 12/2020 | Zamir | B29B 7/728 |
| 2021/0001526 A1 | 1/2021 | Hirano et al. | |
| 2021/0247754 A1* | 8/2021 | Takahashi | B29C 45/76 |

FOREIGN PATENT DOCUMENTS

| | | |
|---|---|---|
| CN | 109571897 A | 4/2019 |
| CN | 109753019 A | 5/2019 |
| JP | H6-31787 A | 2/1994 |
| JP | 2017-132260 A | 8/2017 |
| JP | 6294268 B2 | 3/2018 |
| JP | 6346128 B2 | 6/2018 |
| JP | 2018-185723 A | 11/2018 |
| JP | 2019-14187 A | 1/2019 |
| JP | 2019-166702 A | 10/2019 |
| TW | 200635749 A | 10/2006 |

OTHER PUBLICATIONS

Office Action for Taiwanese Patent Application No. 109135887 mailed on Dec. 5, 2023, with its Machine Translation, 33 pages.
First Office Action for Chinese Application No. 202080073194.1 mailed on Feb. 27, 2024, with its English translation, 13 pages.

* cited by examiner

MOLDING MACHINE, METHOD AND COMPUTER-READABLE MEDIUM USING MULTIPLE LEARNING MODELS

CROSS-REFERENCE TO RELATED APPLICATIONS

This application is the national phase under 35 U. S. C. § 371 of PCT International Application No. PCT/JP2020/ 038176 which has an International filing date of Oct. 8, 2020 and designated the United States of America.

FIELD

The present disclosure relates to a learning model generation method, a computer program, a set value determination device, a molding machine, and a molding apparatus system.

BACKGROUND

Japanese Patent No. 6346128 discloses an injection molding system and a machine learning device for determining an optimum operating condition having low power consumption by a reinforcement learning device and adjusting the operating condition.

Japanese Patent No. 6294268 discloses an abnormality diagnosis apparatus for diagnosing an abnormality in an injection molding machine by machine learning.

SUMMARY

However, the injection molding system according to Japanese Patent No. 6346128 is a system that determines a set value related to a molding machine by reinforcement learning, and has a problem that a huge amount of training data or training work is required. Accurate simulation of a molding process is extremely difficult, and molding control using an actual machine and an operation for confirming a molding result are necessary. Even when the molding control and the operation for confirming the molding result may be automated, a huge amount of resin material is required, there is no change in the fact that a lot of defective products may be generated in a learning process, and it is difficult to complete reinforcement learning in reality.

The apparatus of Japanese Patent No. 6294268 may perform an abnormality diagnosis of injection molding, and cannot determine an optimum set value of the molding machine.

An object of the present invention is to provide a learning model generation method, a computer program, a set value determination device, a molding machine, and a molding apparatus system capable of generating a learning model for determining a set value of a molding machine, and reducing training data required for training the learning model.

A learning model generation method according to an aspect of the present disclosure is a learning model generation method for generating a learning model for determining a set value related to a molding machine, the method comprising: collecting first training data including the set value related to the molding machine, a measured value obtained by measuring a physical quantity related to molding by the molding machine when the molding is executed, and a degree of quality of a molded product generated by the molding machine in a state where the set value is set and the measured value is obtained; generating a first learning model for outputting a degree of quality of a molded product generated by the molding machine when the set value and the measured value are input by machine learning based on collected first training data; collecting second training data including a defect degree for each defect type of a molded product, the measured value, and the set value capable of reducing at least the defect degree in a state where the defect degree and the measured value are obtained or a change quantity of the set value; and generating a second learning model for outputting the set value capable of reducing at least the defect degree or a change quantity of the set value when the defect degree and the measured value are input by machine learning based on collected second training data and a degree of quality output from the first learning model.

A computer program according to an aspect of the present disclosure is a computer program for causing a computer to generate a learning model for determining a set value related to a molding machine, the computer program causing the computer to execute processes of: collecting first training data including the set value related to the molding machine, a measured value obtained by measuring a physical quantity related to molding by the molding machine when the molding is executed, and a degree of quality of a molded product generated by the molding machine in a state where the set value is set and the measured value is obtained; generating a first learning model for outputting a degree of quality of a molded product generated by the molding machine when the set value and the measured value are input by machine learning based on collected first training data; collecting second training data including a defect degree for each defect type of a molded product, the measured value, and the set value capable of reducing at least the defect degree in a state where the defect degree and the measured value are obtained or a change quantity of the set value; and generating a second learning model for outputting the set value capable of reducing at least the defect degree or a change quantity of the set value when the defect degree and the measured value are input by machine learning based on collected second training data and a degree of quality output from the first learning model.

A set value determination device according to an aspect of the present disclosure is a set value determination device for generating a learning model for determining a set value related to a molding machine and determining the set value based on a generated learning model, the device comprising: a first collection processing unit configured to collect first training data including the set value related to the molding machine, a measured value obtained by measuring a physical quantity related to molding by the molding machine when the molding is executed, and a degree of quality of a molded product generated by the molding machine in a state where the set value is set and the measured value is obtained; a first learning processing unit configured to generate a first learning model for outputting a degree of quality of a molded product generated by the molding machine when the set value and the measured value are input by machine learning based on first training data collected by the first collection processing unit; a second collection processing unit configured to collect second training data including a defect degree for each defect type of a molded product, the measured value, and the set value capable of reducing at least the defect degree in a state where the defect degree and the measured value are obtained or a change quantity of the set value; and a second learning processing unit configured to generate a second learning model for outputting the set value capable of reducing at least the defect degree or a change quantity of the set value when the defect degree and the measured value are input by machine learning based on second training data collected by the second collection processing unit and a degree of quality output from the first learning model.

A molding machine according to an aspect of the present disclosure includes a first acquisition unit configured to acquire a defect degree for each defect type of a molded product produced by a molding machine, a second acquisition unit configured to acquire a measured value obtained by measuring a physical quantity related to molding by the molding machine when the molding is executed, and a learning model from which a set value related to the molding machine is output, the set value being capable of reducing at least the defect degree in a state where the defect degree acquired by the first acquisition unit and the measured value acquired by the second acquisition unit are obtained when the defect degree and the measured value are input, in which the molding machine inputs the defect degree acquired by the first acquisition unit and the measured value acquired by the second acquisition unit to the learning model to output the set value, and operates based on the output set value.

A molding apparatus system according to an aspect of the present disclosure comprises the above set value determination device and a molding machine.

According to the above description, it is possible to generate a learning model for determining a set value of a molding machine, and reduce training data required for training the learning model.

The above and further objects and features will more fully be apparent from the following detailed description with accompanying drawings.

DETAILED DESCRIPTION

Hereinafter, specific examples of a learning model generation method, a computer program, a set value determination device, a molding machine, and a molding apparatus system according to embodiments of the invention will be described below with reference to the drawings. At least some of the embodiments described below may be arbitrarily combined. It should be noted that the invention is not limited to these examples, is indicated by the scope of claims, and is intended to include all modifications within the meaning and scope equivalent to the scope of claims.

First Embodiment

Figure 1:
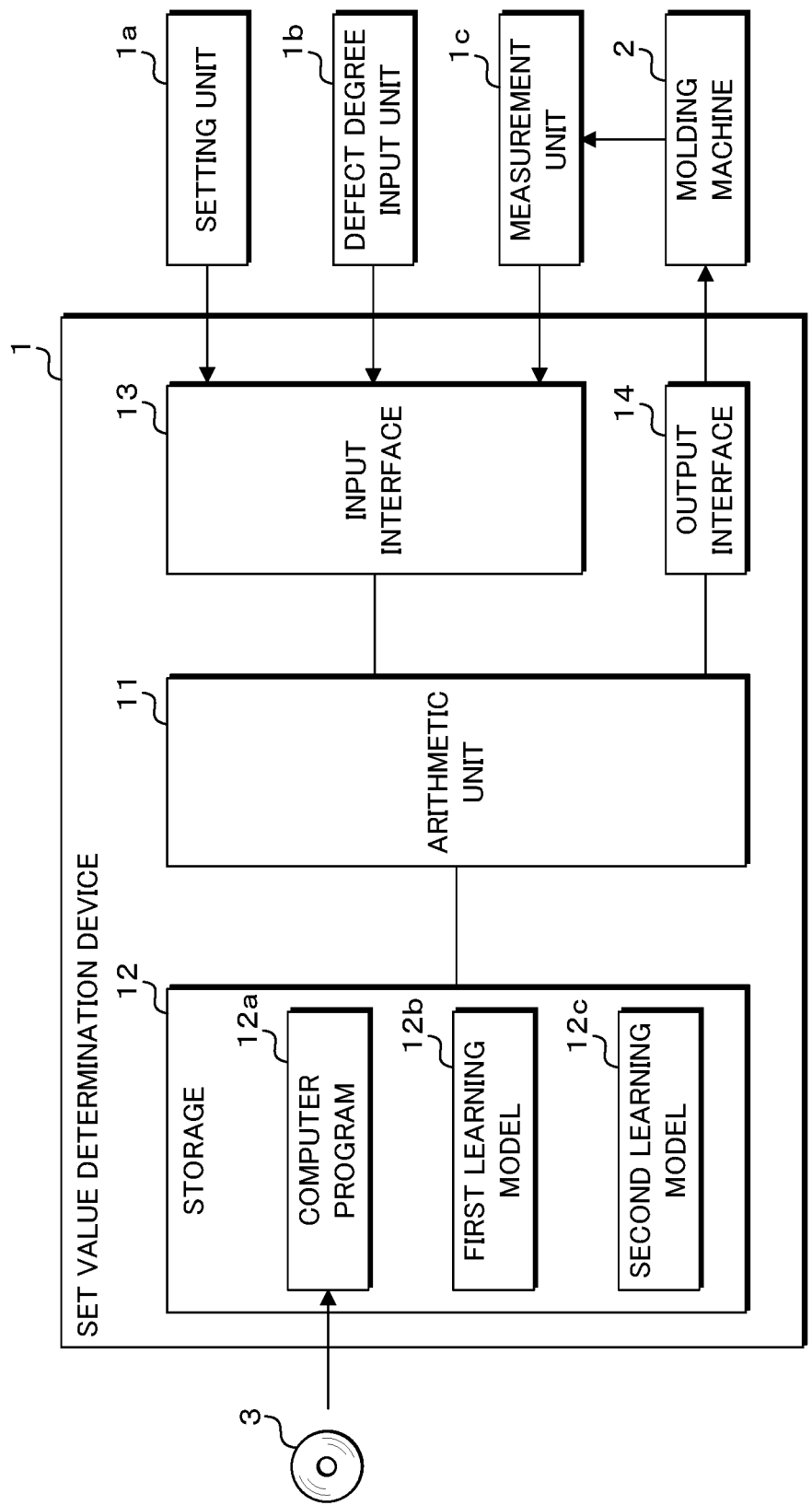
FIG. 1 is a block diagram illustrating a configuration example of a molding apparatus system according to a first embodiment.

FIG. 1 is a block diagram illustrating a configuration example of a molding apparatus system according to a first embodiment. The molding apparatus system according to the first embodiment includes a set value determination device 1 and a molding machine 2.

The molding machine 2 is, for example, an injection molding machine, a hollow molding machine, a film forming machine, an extruder, a twin-screw extruder, a spinning extruder, a granulator, a magnesium injection molding machine, etc. Hereinafter, in the first embodiment, a description will be given on the assumption that the molding machine 2 is the injection molding machine. The injection molding machine includes an injection device and a mold clamping device disposed in front of the injection device. The injection device includes a heating cylinder, a screw that may be driven in a rotational direction and an axial direction in the heating cylinder, a rotary motor that drives the screw in the rotational direction, a motor that drives the screw in the axial direction, etc. The mold clamping device includes a toggle mechanism that opens and closes a mold and tightens the mold so that the mold does not open when a molten resin injected from the injection device fills the mold, and a motor that drives the toggle mechanism.

A set value for determining a molding condition such as a resin temperature in the mold, a nozzle temperature, a cylinder temperature, a hopper temperature, a mold clamping force, an injection speed, injection acceleration, an injection peak pressure, an injection stroke, a cylinder tip resin pressure, a reverse protection ring seated state, a switching pressure of holding pressure, a switching speed of holding pressure, a switching position of holding pressure, a holding pressure completion position, a cushion position, a weighing back pressure, weighing torque, a weighing completion position, a screw retreat speed, a cycle time, a mold closing time, an injection time, a pressure holding time, a weighing time, a mold opening time, etc. is set in the molding machine 2, and the molding machine 2 is operated according to the set value. An optimum set value differs depending on the molded product.

A set value adjustment device is a computer and includes an arithmetic unit 11, a storage 12, an input interface 13, and an output interface 14. The arithmetic unit 11 includes an arithmetic circuit such as a CPU (Central Processing Unit), a multi-core CPU, a GPU (Graphics Processing Unit), a GPGPU (General-purpose computing on graphics processing units), a TPU (Tensor Processing Unit), an ASIC (Application Specific Integrated Circuit), an FPGA (Field-Programmable Gate Array), or an NPU (Neural Processing Unit), an internal storage device such as a ROM (Read Only Memory) or a RAM (Random Access Memory), an I/O terminal, etc. The arithmetic unit 11 functions as the set value determination device 1 according to the present embodiment by executing a computer program 12a stored in the storage 12 described later. Each functional unit of the set value determination device 1 may be realized by software, or some or all functional units thereof may be realized by hardware.

The storage 12, the input interface 13, and the output interface 14 are connected to the arithmetic unit 11.

The set value determination device 1 may be a server device connected to a network (not illustrated).

The storage 12 is a nonvolatile memory such as a hard disk, an EEPROM (Electrically Erasable Programmable ROM), or a flash memory. The storage 12 stores the computer program 12a for causing the computer to execute a learning model generation method according to the first embodiment. The learning model generation method is a method of determining a set value related to the molding machine 2 so that a degree of non-defectiveness of molded products is improved. Further, the storage 12 stores a first learning model 12b and a second learning model 12c generated by a model generation method described later.

The computer program 12a according to the present embodiment may be recorded on a recording medium 3 so as to be readable by the computer. The storage 12 stores the computer program 12a read from the recording medium 3 by a reading device (not illustrated). The recording medium 3 is a semiconductor memory such as a flash memory. Further, the recording medium 3 may be an optical disc such as a CD (Compact Disc)-ROM, a DVD (Digital Versatile Disc)-ROM, or a BD (Blu-ray (registered trademark) Disc). Further, the recording medium 3 may be a flexible disk, a magnetic disk such as a hard disk, a magnetic optical disk, etc. Furthermore, the computer program 12a according to the present embodiment may be downloaded from an external server (not illustrated) connected to a communication network (not illustrated) and stored in the storage 12.

The arithmetic unit 11 includes a processor such as a CPU (Central Processing Unit), a multi-core CPU, a GPU (Graphics Processing Unit), a GPGPU (General-purpose computing on graphics processing units), or a TPU (Tensor Processing Unit), an internal storage device such as a ROM (Read Only Memory) or a RAM (Random Access Memory), an I/O terminal, etc., and the storage 12, the input interface 13, and the output interface 14 are connected to the I/O terminal. The arithmetic unit 11 generates the first learning model 12b and the second learning model 12c for determining the set value related to the molding machine 2 by executing the computer program 12a stored in the storage 12. Details of methods of generating the first and second learning models 12b and 12c will be described later.

A setting unit 1a, a defect degree input unit 1b, and a measurement unit 1c are connected to the input interface 13.

The setting unit 1a is an interface for manually inputting a set value that determines the molding condition of the molding machine 2. The setting unit 1a is an operation panel having, for example, a button, a touch panel, etc. The setting unit 1a outputs data of the input set value to the input interface 13.

The defect degree input unit 1b is an interface for inputting a defect degree for each defect type of a molded product molded by the molding machine 2. The defect type includes, for example, types such as sink marks, burr, void, etc. The defect degree is a degree of defect, an incidence rate of defect, etc. The defect degree input unit 1b is an operation panel having, for example, a button, a touch panel, etc., and receives the defect degree manually. The defect degree input unit 1b outputs data of the input defect degree for each defect type to the input interface 13. Further, the defect degree input unit 1b may include, for example, a camera that photographs the molded product, and an image analysis processor that calculates the defect degree for each defect type by analyzing an image photographed by the camera. The defect degree input unit 1b outputs data of a defect degree for each defect type obtained by image analysis to the input interface 13.

The measurement unit 1c is a device that measures a physical quantity related to molding when the molding by the molding machine 2 is executed. The measurement unit 1c outputs a physical quantity data obtained by a measurement process to the set value determination device 1. Examples of the physical quantity include temperature, position, speed, acceleration, current, voltage, pressure, time, image data, torque, force, strain, power consumption, etc.

For example, information measured by the measurement unit 1c includes molded product information, a molding condition (measured value), a peripheral device set value (measured value), atmosphere information, etc. The peripheral device is a device included in a system linked with the molding machine 2, and includes the mold clamping device or the mold. For example, the peripheral device is a molded product take-out device (robot), an insert product insertion device, a nesting insertion device, a foil feeder for in-mold molding, a hoop feeder for hoop molding, a gas injection device for gas assist molding, a gas injection device or a long fiber injection device for foam molding using supercritical fluid, an LIM molding material mixing device, a molded product deburring device, a runner cutting device, a molded product weighing scale, a molded product strength tester, a molded product optical inspection device, a molded product photographing device, an image processing device, a molded product transporting robot, etc.

For example, the molded product information includes information such as a camera image obtained by photographing the molded product, the deformation amount of the molded product obtained by a laser displacement sensor, chromaticity of the molded product obtained by an optical measuring instrument, an optical measured value such as luminance, a weight of the molded product measured by a weighing scale, and the strength of the molded product measured by a strength measuring instrument. The molded product information expresses whether or not the molded product is normal, the defect type, and the defect degree.

The molding condition includes information such as a resin temperature in the mold, a nozzle temperature, a cylinder temperature, a hopper temperature, a mold clamping force, an injection speed, injection acceleration, an injection peak pressure, an injection stroke, a cylinder tip resin pressure, a reverse protection ring seated state, a switching pressure of holding pressure, a switching speed of holding pressure, a switching position of holding pressure, a holding pressure completion position, a cushion position, a weighing back pressure, weighing torque, a weighing completion position, a screw retreat speed, a cycle time, a mold closing time, an injection time, a pressure holding time, a weighing time, or a mold opening time measured and obtained using a thermometer, a pressure gauge, a speed measuring instrument, an acceleration measuring instrument, a position sensor, a timer, a weighing scale, etc.

The peripheral device set value includes information such as a mold temperature set as a fixed value, a mold temperature set as a variable value, and the pellet supply amount measured and obtained using a thermometer, a weighing instrument, etc.

The atmosphere information includes information such as an atmosphere temperature, atmosphere humidity, and information related to convection (Reynolds number, etc.) obtained using a thermometer, a hygrometer, a flow meter, etc.

In addition, the measurement unit 1c may measure the mold opening amount, the backflow amount, the tie bar deformation amount, and a heater heating rate.

The measurement unit 1c outputs data of the measured values obtained by the measurement process to the input interface 13.

The molding machine 2 is connected to the output interface 14. The output interface 14 outputs data of the set value calculated through an arithmetic process by the arithmetic unit 11 to the molding machine 2. The set value is a value that determines a molding condition such as an injection speed, an injection stroke, a cylinder temperature, a mold clamping force, or a pressure holding time.

Figure 2:
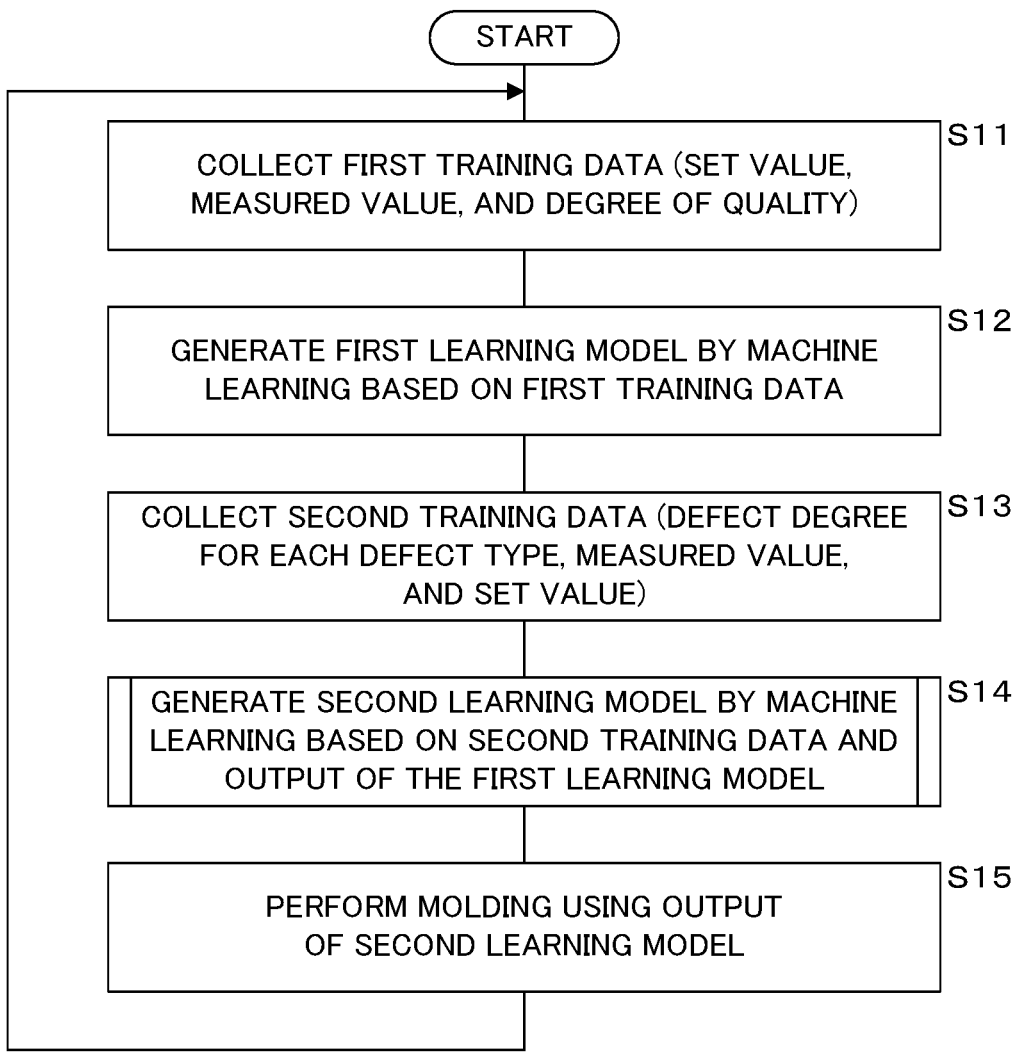
FIG. 2 is a flowchart illustrating a learning model generation method according to the first embodiment.

FIG. 2 is a flowchart illustrating the learning model generation method according to the first embodiment. The arithmetic unit 11 of the set value determination device 1 executes the learning model generation method for generating a learning model for determining the set value related to the molding machine 2.

The arithmetic unit 11 collects first training data for training the first learning model 12b that may determine or classify the quality of the molded product (step S11).

The first training data includes a set value related to the molding machine 2, a measured value obtained by measuring a physical quantity related to molding by the molding machine 2 when the molding is executed, and a degree of quality of the molded product generated by the molding machine 2 in a state where the set value is set and the measured value is obtained.

The degree of quality of the molded product may be data indicating a non-defective product and a defective product using binary values such as (1, 0), or data indicating the degree of quality of the molded product numerically. The degree of quality of the molded product may be calculated based on the defect degree output from the defect degree input unit 1b.

The first training data may be collected by acquiring data of set values, measured values, and degrees of quality from one molding machine 2 and storing the data in the storage 12, or may be a collection of data of set values, measured values, and degrees of quality obtained from a plurality of molding machines 2. Further, the first training data may be collected by acquiring data of set values, measured values, and degrees of quality stored in the external server or the storage device.

Figure 3:
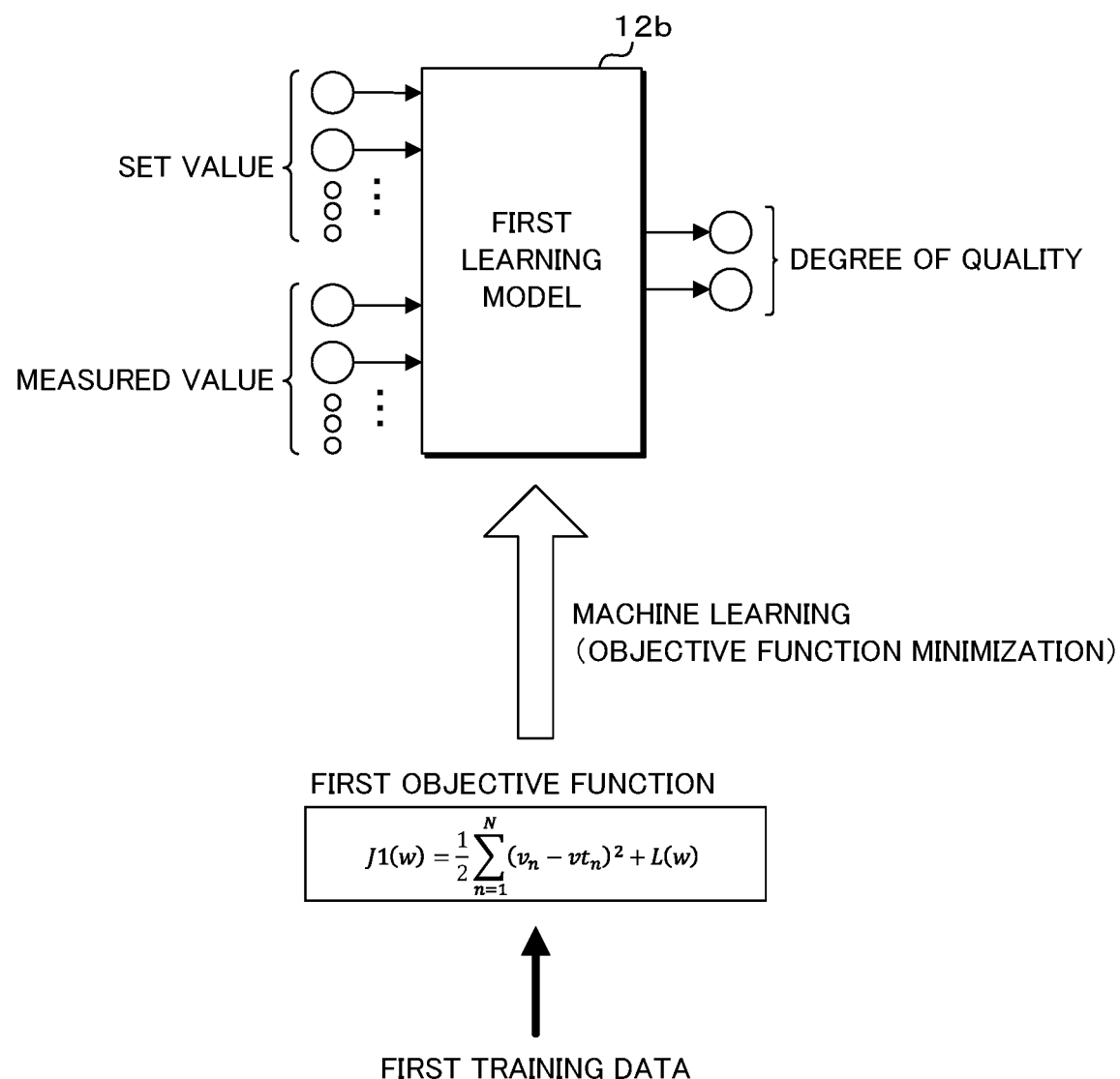
FIG. 3 is a schematic diagram illustrating a method of generating a first learning model.

FIG. 3 is a schematic diagram illustrating a method of generating the first learning model 12b. The arithmetic unit 11 collecting the first training data in the processing of step S11 generates, by machine learning based on the collected first training data, the first learning model 12b that outputs a degree of quality of the molded product generated by the molding machine 2 in a state where a set value is set and a measured value is obtained when the set value and the measured value are input (step S12).

The first learning model 12b is a classification type neural network (machine learning device) that outputs, for example, the probability that the molded product is a non-defective product and the probability that the molded product is a defective product. The first learning model 12b includes an input layer, a hidden layer, and an output layer.

The input layer has a plurality of nodes to which set values of a plurality of items for determining molding conditions are input, and a plurality of nodes to which measured values of a plurality of items are input.

The hidden layer includes a plurality of intermediate layers each having a plurality of nodes, and a node of an intermediate layer on the input side is connected to a node of the input layer. An activation function of each node is, for example, a sigmoid function, a hyperbolic tangent function, a ReLu function, or a LeakyReLU function. A part of the hidden layer may be used as a dropout layer.

The output layer has a node that outputs the probability that the molded product is a non-defective product and a node that outputs the probability that the molded product is a defective product. Each node of the output layer is connected to a node of the intermediate layer on the output side.

The arithmetic unit 11 machine-trains the first learning model 12b by optimizing a weighting coefficient of the first learning model 12b by an error back propagation method, an error gradient descent method, etc. using the first training data. Specifically, the arithmetic unit 11 adjusts the weighting coefficient so that a first objective function represented by the following Equation (1) is minimized.

[Equation 1]

$$J1(w) = \frac{1}{2}\sum_{n=1}^{N}(v_n - vt_n)^2 + L(w) \qquad (1)$$

where
J1(w): First objective function
w: Weighting coefficient
$v_n$: Degree of quality output from first learning model
$vt_n$: Target output (teacher data of degree of quality)
L(w): Weight attenuation term Subsequently, the arithmetic unit 11 collects second training data for training the second learning model 12c that may output a set value or a change quantity of the set value that may reduce the defect degree (step S13).

The second training data includes a defect degree for each defect type of the molded product, a measured value, and a set value capable of reducing at least the defect degree in a state where the defect degree and the measured value are obtained or the change quantity of the set value.

The second training data may be collected by acquiring data of a defect degree for each defect type, a measured value, a set value that may reduce the defect degree, or the change quantity from one molding machine 2 and storing the data in the storage 12, or may be a collection of defect degrees set values, measured values, set values, or the change quantities obtained from a plurality of molding machines 2. In addition, the second training data may be collected by acquiring data of a set value, a measured value, a set value, or the change quantity stored in the external server or the storage device.

Subsequently, the second learning model 12c, which outputs a set value capable of reducing at least a defect degree or the change quantity of the set value when the defect degree and a measured value are input, is generated by machine learning based on the collected second training data and the degree of quality output from the first learning model 12b (step S14).

Figure 4:
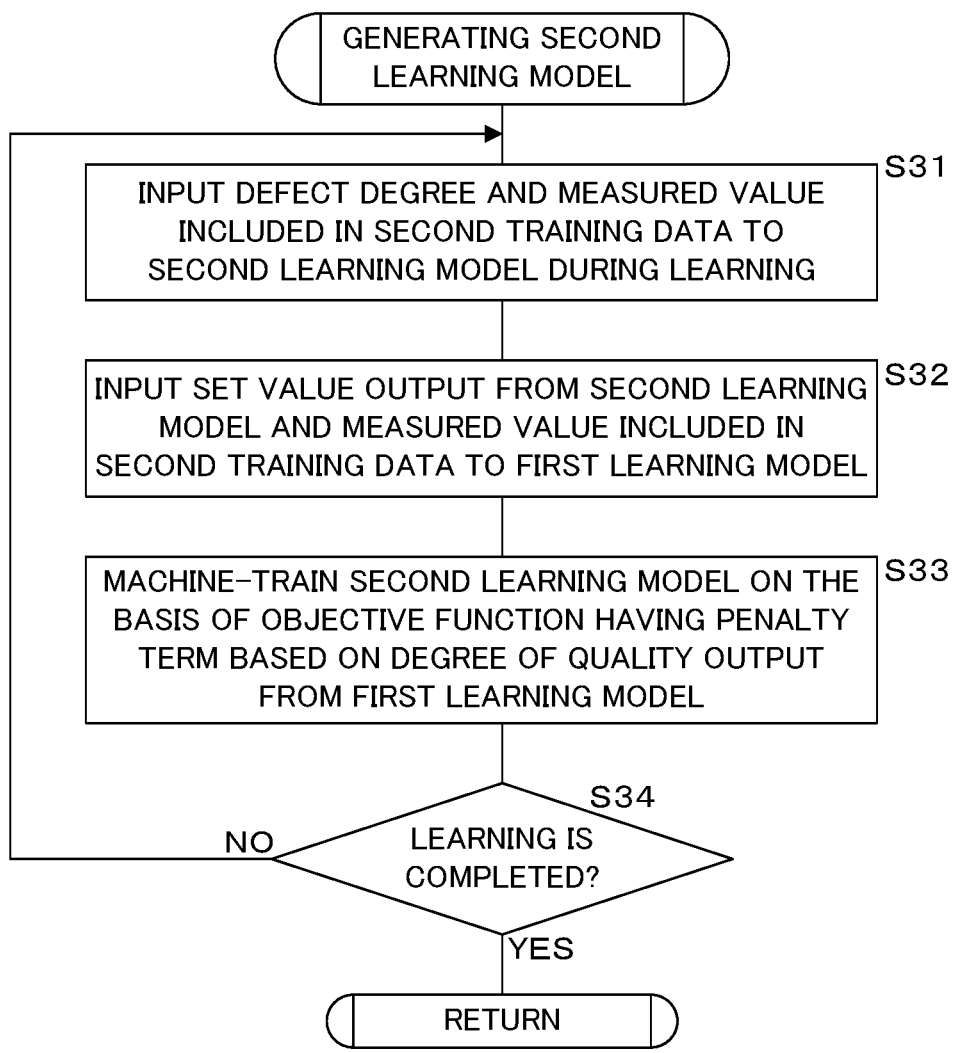
FIG. 4 is a flowchart illustrating a method of generating a second learning model.
Figure 5:
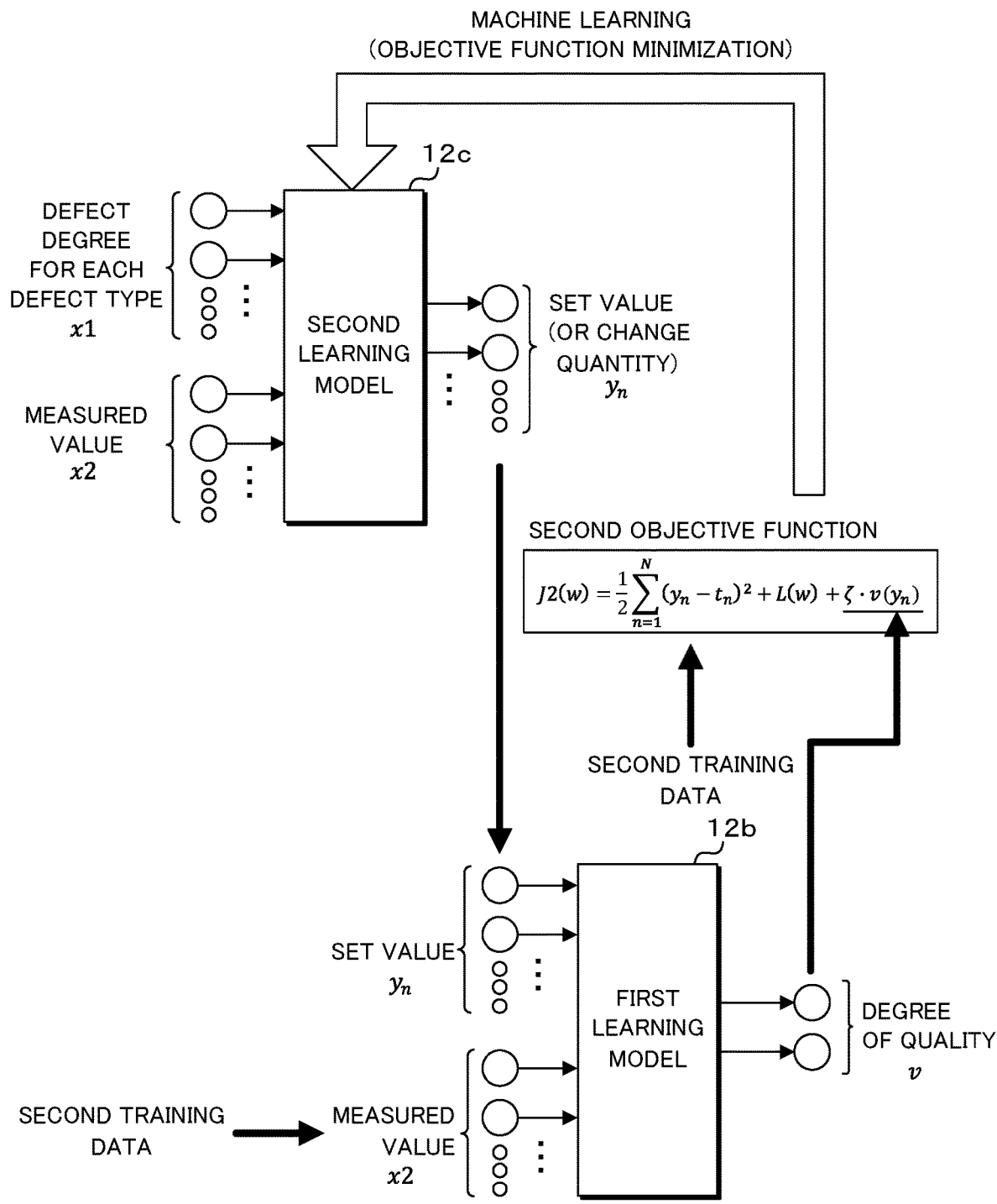
FIG. 5 is a schematic diagram illustrating a method of generating the second learning model.

FIG. 4 is a flowchart illustrating a method of generating the second learning model 12c, and FIG. 5 is a schematic diagram illustrating a method of generating the second learning model 12c. The second learning model 12c is a recurrent neural network (machine learning device) that outputs a set value or the change quantity. The second learning model 12c includes an input layer, a hidden layer, and an output layer.

The input layer has a plurality of nodes to which respective defect degrees are input for respective defect types, and a plurality of nodes to which respective measured values of a plurality of items are input. The hidden layer includes a plurality of intermediate layers each having a plurality of nodes. A configuration of the hidden layer is similar to that of the hidden layer of the first learning model 12b. A node in the intermediate layer on the input side is connected to a node in the input layer.

The output layer has a plurality of nodes from which set values of a plurality of respective items defining molding conditions or the change quantities (adjustment amounts) of the set values are output. Each node of the output layer is connected to a node of the intermediate layer on the output side.

The arithmetic unit 11 inputs the defect degree and the measured value included in the second training data to the second learning model 12c during learning (step S31). Then, the arithmetic unit 11 inputs a set value output from the second learning model 12c during machine learning or a set value based on the change quantity output from the second learning model 12c during machine learning, and a measured value included in the second training data to the first learning model 12b (step S32).

In step S33, the arithmetic unit 11 machine-trains the second learning model 12c by optimizing a weighting coefficient of the second learning model 12c by an error back propagation method, an error gradient descent method, etc. using the second training data and data of the degree of quality output from the first learning model 12b. Specifically, the arithmetic unit 11 adjusts the weighting coefficient so that a second objective function represented by the following Equation (2) is minimized.

[Equation 2]

$$J2(w) = \frac{1}{2}\sum_{n=1}^{N}(y_n - t_n)^2 + L(w) + \zeta \cdot v(y_n) \quad (2)$$

J2(w): Second objective function
w: Weighting coefficient
$y_n$: Set value (or change quantity) output from second learning model
$t_n$: Target output (teacher data of set value)
L(w): Weight attenuation term
$\zeta$: Parameter
$v(y_n)$: Degree of quality output from first learning model As may be seen from the above Equation (2), the second objective function used to generate the second learning model 12c is a function, a value of which decreases as a difference between the set value or change quantity output from the second learning model 12c and the set value or change quantity included in the second training data decreases, as a degree of the non-defective product indicated by the degree of quality output from the first learning model 12b increases, or as a degree of defect decreases.

More specifically, the second objective function has a penalty term in addition to a normal error term and the weight attenuation term. The penalty term is a function, a value of which increases as the degree of the defective product indicated by the degree of quality output from the first learning model 12b increases. In addition, the penalty term has a parameter that determines a change rate of the value with respect to the degree of quality. The penalty term is configured by multiplying the function by a parameter.

The arithmetic unit 11 ending the processing of step S33 determines whether or not the machine learning of the second learning model 12c based on the second training data is completed (step S34). When it is determined that the machine learning of the second learning model 12c is not completed (step S34: NO), the arithmetic unit 11 returns the processing to step S31 and continues the machine learning of the second learning model 12c. When it is determined that the machine learning of the second learning model 12c is completed (step S34: YES), the arithmetic unit 11 ends a generation process of the second learning model 12c.

Subsequently, the arithmetic unit 11 outputs the data of the set value calculated using the second learning model 12c trained in the processing of steps S11 to S14 to the molding machine 2 via the output interface 14, and the molding machine 2 performs molding using the output of the second learning model 12c (step S15).

Subsequently, the arithmetic unit 11 returns the processing to step S11, and similarly machine-trains the first learning model 12b and the second learning model 12c thereafter. That is, the arithmetic unit 11 collects the first training data obtained by the molding in step S15 in step S11, and machine-trains the first learning model 12b by machine learning based on the collected and obtained first training data. Then, the second learning model 12c is machine-trained using the output of the trained first learning model 12b.

The timing of returning to step S11 and machine-training the first learning model 12b and the second learning model 12c is not particularly limited. For example, the arithmetic unit 11 may return to step S15 each time molding is performed, or may return the processing to step S11 after molding is performed a predetermined number of times in step S15. Further, the arithmetic unit 11 may be configured to machine-train the first learning model 12b and the second learning model 12c at different timings according to the collection status of the first training data and the second training data.

As described above, according to the first embodiment, since the second learning model 12c is trained using the second objective function having a penalty term, a learning model for determining the set value of the molding machine 2 may be generated, and training data necessary for learning of the learning model may be reduced.

The set value necessary for learning of the second learning model 12c is limited to a set value capable of reducing at least the defect degree. However, the first learning model 12b may be trained using all pieces of molding data regardless of the defect degree, and thus all pieces of molding data acquired in real time may be effectively utilized.

Further, the first learning model 12b and the second learning model 12c may be sequentially mutually trained, or one of the learning models may be used only for inference and only the other learning model may be trained.

Second Embodiment

A learning model generation method, a computer program, a set value determination device, and a molding machine according to a second embodiment are different from those of the first embodiment in that a set value determination device 201 is provided in a molding machine 202. Therefore, the difference will be mainly described below. Since other configurations, actions, and effects are similar to those in the first embodiment, the corresponding parts are designated by similar reference symbols and detailed description thereof will be omitted.

Figure 6:
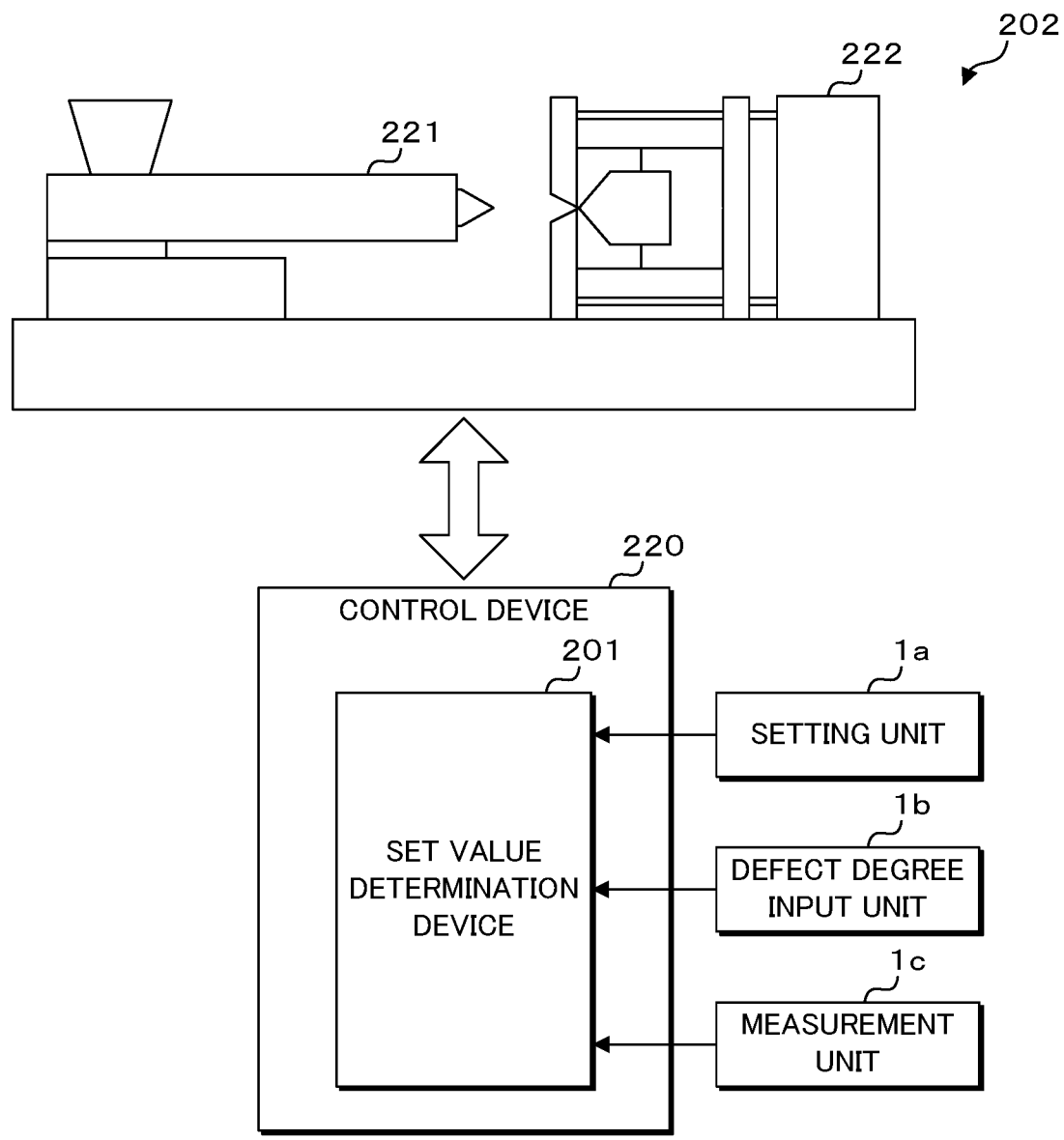
FIG. 6 is a block diagram illustrating a molding machine according to a second embodiment.

FIG. 6 is a block diagram illustrating the molding machine 202 according to the second embodiment. The molding machine 202 according to the second embodiment includes an injection device 221, a mold clamping device 222 disposed in front of the injection device 221, and a control device 220 for controlling the operation of the molding machine 202. The control device 220 includes the set value determination device 201 described in the first embodiment.

Figure 7:
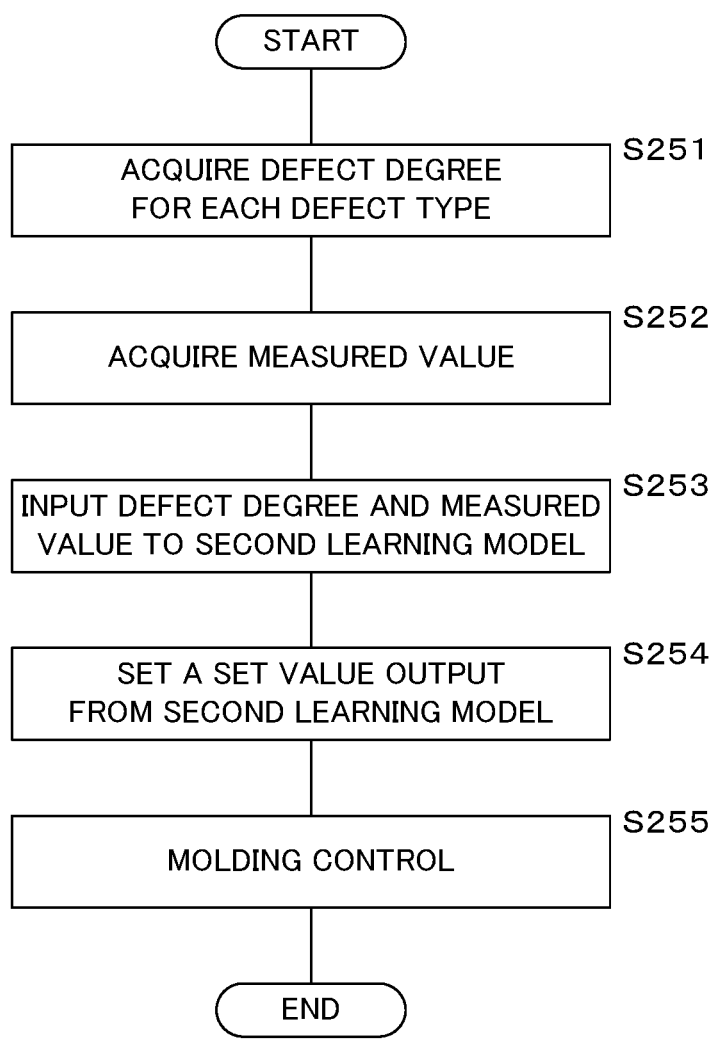
FIG. 7 is a flowchart illustrating a set value determination method.

FIG. 7 is a flowchart illustrating a set value determination method. The following processing is processing executed by the set value determination device 201 and the control device 220 of the molding machine 202 after the first and second learning models 12b and 12c are generated. The set value determination device 201 acquires a defect degree for each defect type from the defect degree input unit 1b (step S251). Further, the set value determination device 201 acquires a measured value from the measurement unit 1c (step S252).

The set value determination device 201 inputs the defect degree and the measured value acquired in step S251 and step S252 to the second learning model 12c (step S253), and sets a set value output from the second learning model 12c in the molding machine 202 (step S254). The control device 220 of the molding machine 202 executes molding control based on the set value determined and set by the set value determination device 201 (step S255).

According to the molding machine 202 according to the second embodiment, the molding machine 202 may machine-train the first learning model 12b and the second learning model 12c, determine a set value capable of reducing the defect degree, and operate based on the determined set value.

Third Embodiment

A learning model generation method, a computer program, a set value determination device, a molding machine, and a molding apparatus system according to a third embodiment are different from those of the first embodiment in that a set value determination device 301 is provided in a server device 304 outside a molding machine 302. Therefore, the difference will be mainly described below. Since other configurations, actions, and effects are similar to those in the first embodiment, the corresponding parts are designated by similar reference symbols and detailed description thereof will be omitted.

Figure 8:
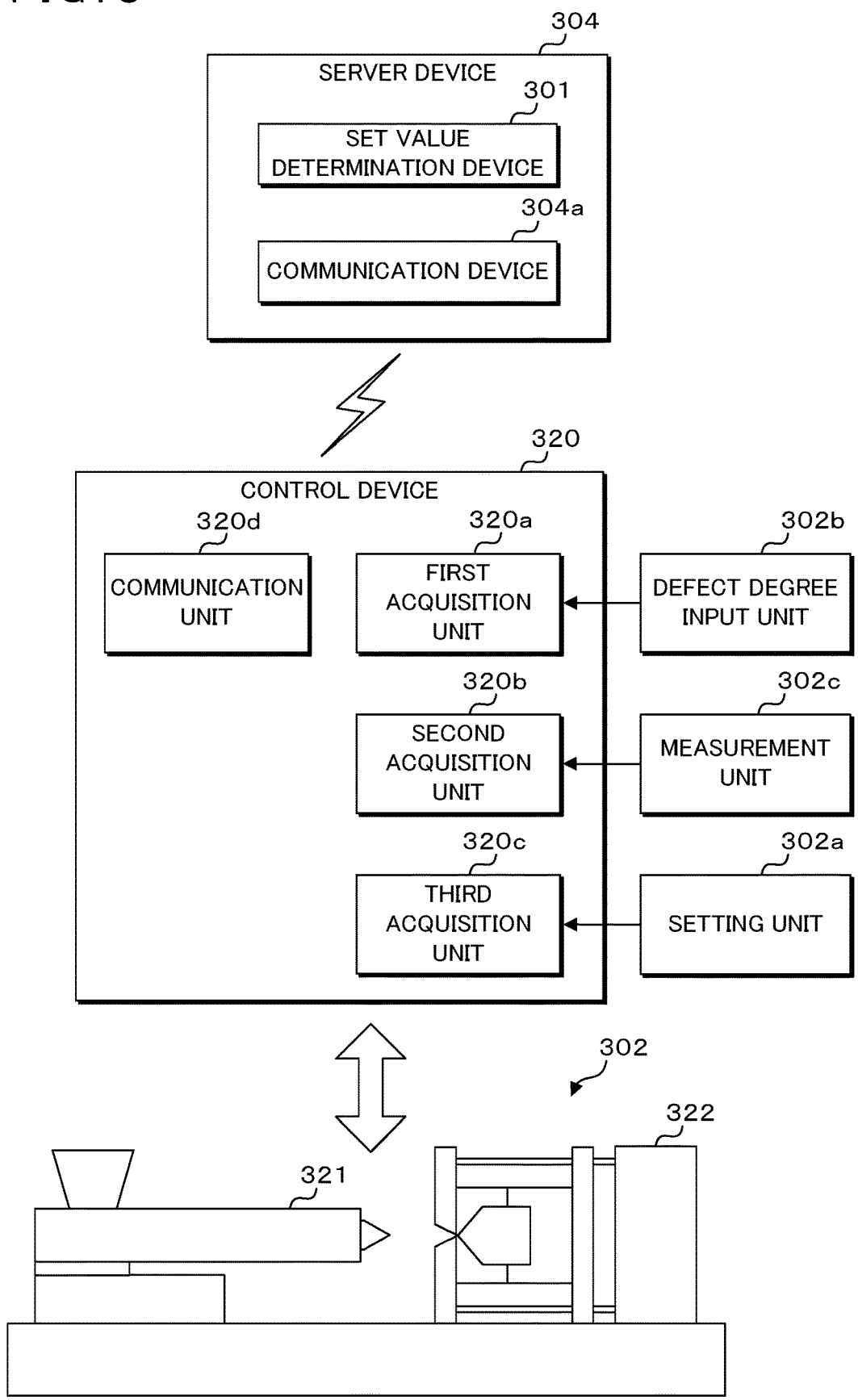
FIG. 8 is a block diagram illustrating a molding apparatus system according to a third embodiment.

FIG. 8 is a block diagram illustrating the molding apparatus system according to the third embodiment. The molding apparatus system according to the third embodiment includes the molding machine 302 and the server device 304 capable of communicating with each other.

The molding machine 302 includes an injection device 321, a mold clamping device 322 disposed in front of the injection device 321, and a control device 320 for controlling the operation of the molding machine 302. The control device 320 includes a first acquisition unit 320a for acquiring a defect degree for each defect type output from a defect degree input unit 302b, a second acquisition unit 320b for acquiring a measured value output from a measurement unit 302c, a third acquisition unit 320c for acquiring a set value output from a setting unit 302a, and a communication unit 320d for transmitting and receiving various information to and from the server device 304.

The communication unit 320d transmits data of a defect degree, a measured value, a set value, etc. necessary for operation of a set value adjustment device to the server device 304. Further, the communication unit 320d requests a set value capable of reducing the defect degree from the server device 304, and receives a set value transmitted from the server device 304 in response to the request. The control device 320 executes molding control based on the received set value.

The server device 304 includes the set value adjustment device and a communication device 304a for transmitting and receiving various information to and from the molding machine 302. The set value adjustment device has a configuration similar to that of the set value adjustment device according to the first embodiment. However, the set value adjustment device according to the third embodiment is different from that of the first embodiment in that the data of the defect degree, the measured value, and the set value, etc. is received by the communication device 304a, and the determined set value is transmitted to the molding machine 302 by the communication device 304a.

According to the molding apparatus system according to the third embodiment, the molding machine 302 transmits the data of the defect degree, the measured value, the set value, etc. necessary for generating the first and second learning models 12b and 12c to the server device 304 by the communication unit 320d. The server device 304 receives the data transmitted from the molding machine 302 by the communication device 304a. The set value determination device 301 stores or collects the data received by the communication device 304a as the first training data and the second training data. Then, the set value determination device 301 generates the first and second learning models 12b and 12c based on the collected first and second training data.

Meanwhile, after the generation of the first and second learning models 12b and 12c is completed on the server device 304 side, the molding machine 302 may request the set value from the server device 304. Specifically, the molding machine 302 transmits the defect degree for each defect type and the measured value to the server device 304 by the communication unit 320d. The server device 304 receives the defect degree and the measured value by the communication device 304a. The set value determination device 301 inputs the defect degree for each defect type and the measured value received by the communication device 304a to the second learning model 12c, thereby outputting a set value or the change quantity of the set value. The server device 304 transmits the set value or the change quantity output from the second learning model 12c to the molding machine 302 by the communication device 304a. The molding machine 302 receives the set value or the change quantity by the communication unit 320d, sets a set value based on the received set value or change quantity in the device thereof, and executes molding control.

According to the molding apparatus system according to the third embodiment, the first and second learning models 12b and 12c may be generated by the server device 304, and a set value capable of reducing the defect degree may be transmitted to the molding machine 302. In addition, the learning model generation method, the computer program 12a, the set value determination device 301, the molding machine 302, and the molding apparatus system according to the third embodiment have effects similar to those of the first embodiment.

(Modification)

Figure 9:
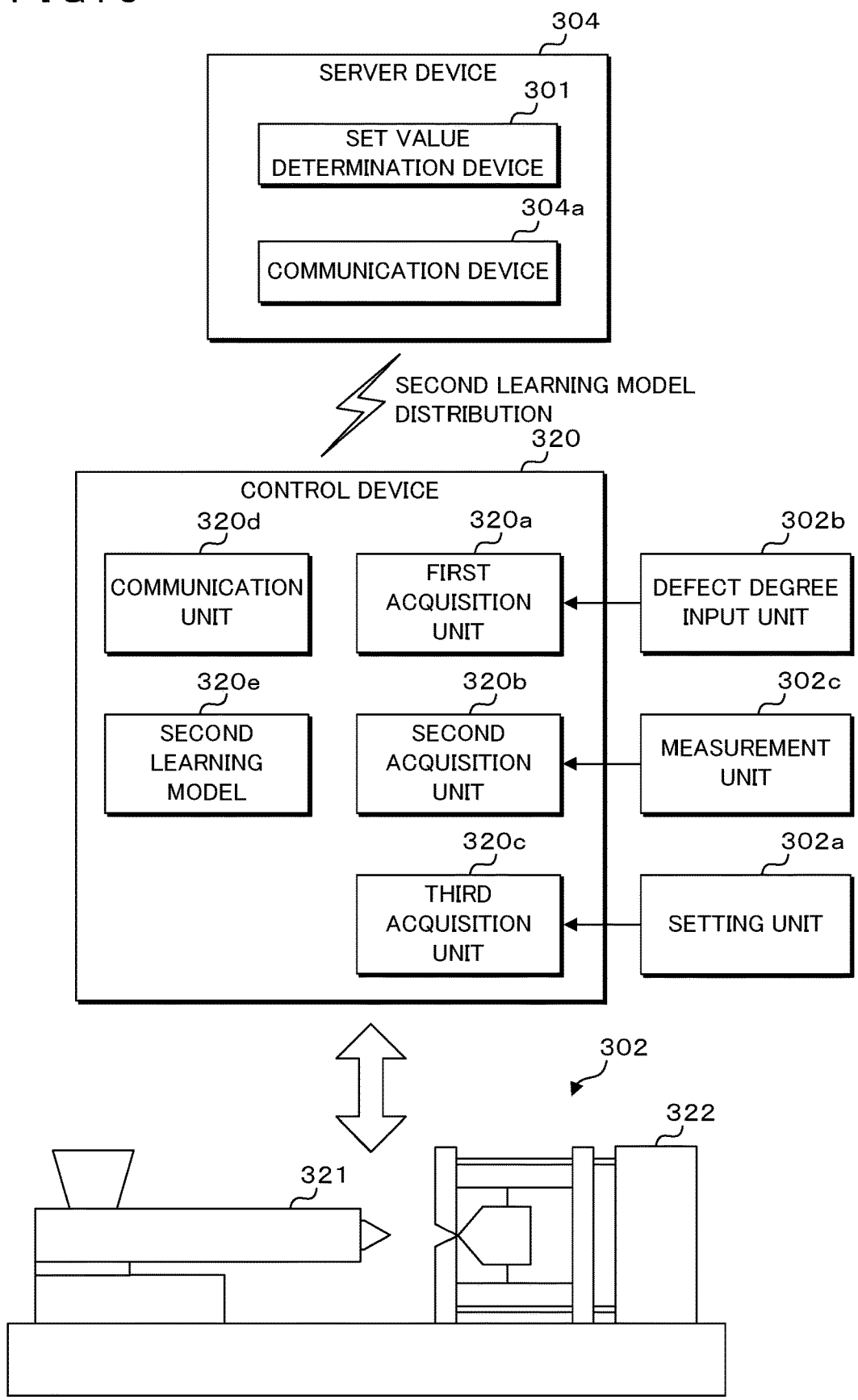
FIG. 9 is a block diagram illustrating a molding apparatus system according to a modification.

FIG. 9 is a block diagram illustrating a molding apparatus system according to a modification. In the third embodiment, the set value is transmitted from the server device 304 to the molding machine 302. However, a generated second learning model 320e may be distributed to the molding machine 302.

The control device 320 of the molding machine 302 receives and stores the second learning model 320e distributed from the server device 304 by the communication unit 320d. The molding machine 302 inputs a defect degree for each defect type acquired by the first acquisition unit 320a and a measured value acquired by the second acquisition unit 320b to the second learning model 320e, sets a set value output from the second learning model 320e or a set value based on the change quantity output from the second learning model 320e in the device thereof and executes molding control.

The learning model generation method, the computer program 12a, the set value determination device 301, the molding machine 302, and the molding apparatus system according to the modification have effects similar to those of the molding apparatus system illustrated in FIG. 8.

It is to be noted that, as used herein and in the appended claims, the singular forms "a", "an", and "the" include plural referents unless the context clearly dictates otherwise.

It is to be noted that the disclosed embodiment is illustrative and not restrictive in all aspects. The scope of the present invention is defined by the appended claims rather than by the description preceding them, and all changes that fall within metes and bounds of the claims, or equivalence of such metes and bounds thereof are therefore intended to be embraced by the claims.

The invention claimed is:

1. A learning model generation method for determining a set value related to a molding machine, the method comprising:
    collecting first training data including a first set value related to the molding machine, a measured value obtained by measuring a physical quantity related to molding by the molding machine, and a degree of quality of a molded product generated by the molding machine in a state where the first set value is set and the measured value is obtained, comprising the substeps of:
    (a) configuring the molding machine based on the first set value;
    (b) engaging the molding machine to perform molding;
    (c) engaging a measurement unit to measure a physical quantity related to molding and output physical quantity data; and
    (d) engaging a defect degree unit to determine the degree of quality of molding, wherein steps (a)-(d) are performed one or more times;
    generating a first learning model by machine learning based on collected first training data, the first learning model outputting a generated degree of quality of a molded product generated by the molding machine when the first set value and the measured value are input to the first learning model;
    collecting second training data including a defect degree of a molded product, the measured value, and a set value or a change quantity of the set value, the set value or the change quantity being capable of reducing the defect degree in a state where the defect degree and the measured value are obtained;
    generating a second learning model by machine learning based on collected second training data and the generated degree of quality output from the first learning model, the second learning model outputting the set value or a change quantity of the set value capable of reducing the defect degree when the defect degree and the measured value are input to the second learning model;
    adjusting a configuration of the molding machine based on the set value outputted by the second learning model; and
    engaging the molding machine to perform molding using the adjusted configuration.

2. The learning model generation method according to claim 1, wherein
    inputting the first set value and the measured value to the first learning model, the first set value being output from the second learning model or being based on the change quantity output from the second learning model during machine learning, the measured value being included in second training data, and
    machine-training the second learning model using the degree of quality output from the first learning model.

3. The learning model generation method according to claim 1, wherein the first learning model is machine-trained by machine learning based on first training data including the set value output from the second learning model or the set value based on the change quantity output from the second learning model, a measured value obtained by measuring a physical quantity related to molding, and a degree of quality of a molded product generated by the molding machine in a state where the set value is set and the measured value is obtained.

4. The learning model generation method according to claim 1, wherein an objective function used to generate the second learning model is a function, a value of which decreases as a difference between the set value or the change quantity output from the second learning model and the set value or the change quantity included in second training data decreases, as a degree of a non-defective product increases, or as a degree of defect decreases, the degree of a non-defective product or the degree of defect being indicated by the degree of quality output from the first learning model.

5. The learning model generation method according to claim 4,
    wherein the objective function has a penalty term, the value of which increases as a degree of a defective product indicated by the degree of quality output from the first learning model increases, and
    the penalty term has a parameter for determining a change rate of the value with respect to the degree of quality.

6. The learning model generation method according to claim 1,
    wherein the first learning model is a machine learning device configured to output a probability that the molded product is a non-defective product and a probability that the molded product is a defective product, and
    the second learning model is a machine learning device configured to output the set value or the change quantity.

7. The learning model generation method according to claim 1, wherein the generated second learning model is distributed to the molding machine.

8. A non-transitory computer readable recording medium storing a computer program for causing a computer to generate a learning model for determining a set value related to a molding machine, the computer program causing the computer to execute processes of:
    collecting first training data including a first set value related to the molding machine, a measured value obtained by measuring a physical quantity related to molding by the molding machine, and a degree of quality of a molded product generated by the molding machine in a state where the first set value is set and the measured value is obtained, comprising the substeps of:
    (a) configuring the molding machine based on the first set value;
    (b) engaging the molding machine to perform molding;
    (c) engaging a measurement unit to measure a physical quantity related to molding and output physical quantity data; and (d) engaging a defect degree unit to determine the degree of quality of molding, wherein steps (a)-(d) are performed one or more times;
generating a first learning model by machine learning based on collected first training data, the first learning model outputting a generated degree of quality of a molded product generated by the molding machine when the first set value and the measured value are input to the first learning model;
collecting second training data including a defect degree of a molded product, the measured value, and a set value or a change quantity of the set value, the set value or the change quantity being capable of reducing the defect degree in a state where the defect degree and the measured value are obtained;
generating a second learning model by machine learning based on collected second training data and the generated degree of quality output from the first learning model, the second learning model outputting the set value or a change quantity of the set value capable of reducing the defect degree when the defect degree and the measured value are input to the second learning model;
adjusting a configuration of the molding machine based on the set value outputted by the second learning model; and
engaging the molding machine to perform molding using the adjusted configuration.

9. A set value determination device for generating a learning model for determining a set value related to a molding machine and determining the set value based on the generated learning model, the device comprising:
a processor; and
a storage storing instructions for causing the processor to execute processes of:
collecting first training data including a first set value related to the molding machine, a measured value obtained by measuring a physical quantity related to molding by the molding machine, and a degree of quality of a molded product generated by the molding machine in a state where the first set value is set and the measured value is obtained, comprising the substeps of:
(a) configuring the molding machine based on the first set value;
(b) engaging the molding machine to perform molding;
(c) engaging a measurement unit to measure a physical quantity related to molding and output physical quantity data; and
(d) engaging a defect degree unit to determine the degree of quality of molding, wherein steps (a)-(d) are performed one or more times;
generating a first learning model by machine learning based on collected first training data, the first learning model outputting a generated degree of quality of a molded product generated by the molding machine when the first set value and the measured value are input to the first learning model;
collecting second training data including a defect degree of a molded product, the measured value, and a set value or a change quantity of the set value, the set value or the change quantity being capable of reducing the defect degree in a state where the defect degree and the measured value are obtained;
generating a second learning model by machine learning based on collected second training data and the generated degree of quality output from the first learning model, the second learning model outputting the set value or a change quantity of the set value capable of reducing the defect degree when the defect degree and the measured value are input to the second learning model;
adjusting a configuration of the molding machine based on the set value outputted by the second learning model; and
engaging the molding machine to perform molding using the adjusted configuration.

10. The molding machine according to claim 9, comprising the set value determination device according to claim 9, the molding machine operating based on the set value determined by the set value determination device.

11. A molding apparatus system, comprising:
the set value determination device according to claim 9; and
the molding machine according to claim 9.

12. A molding machine, comprising:
a control device configured to acquire a defect degree of a molded product produced by a molding machine and a measured value obtained by measuring a physical quantity related to molding by the molding machine; and
a processor comprising memory operably coupled to the processor wherein the memory comprises instructions stored thereon, which when executed by the processor, cause the processor to execute a learning model from which a set value related to the molding machine is output when the defect degree acquired by the control device and the measured value acquired by the control device are input, the set value being capable of reducing at least the defect degree in a state where the defect degree and the measured value are obtained,
wherein the molding machine inputs the defect degree acquired by the control device and the measured value acquired by the control device to the learning model to output the set value by the learning model, and a configuration of the molding machine is automatically adjusted based on the output set value such that the molding machine operates to generate the molded product based on the output set value,
wherein the learning model is machine-trained using a second learning model that outputs a degree of quality of the molded product generated by the molding machine in a state where the set value is set and the measured value is obtained when the set value and the measured value are input to the second learning model.

* * * * *